Sept. 15, 1964   H. D. BOGGS ETAL   3,148,414
MANDREL FOR THE CASTING OF PIPE
Original Filed June 28, 1956
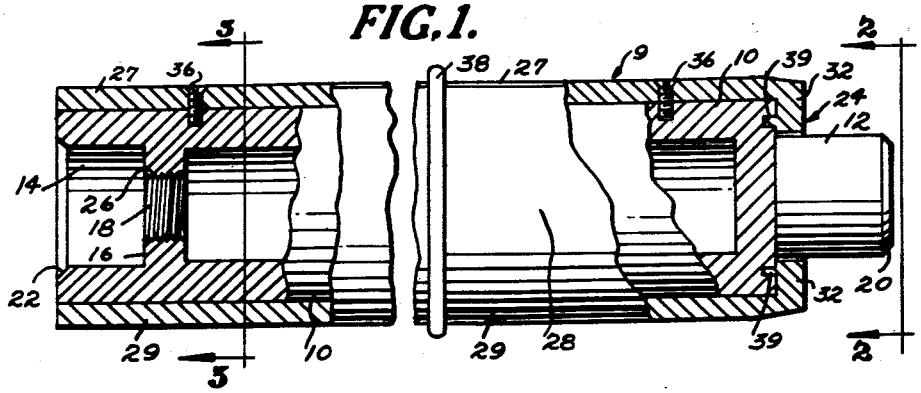
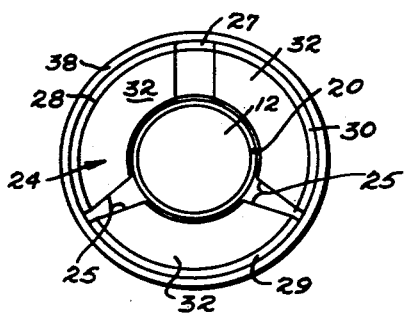
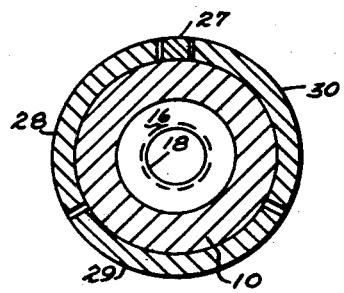
INVENTORS
Herbert D. Boggs
Fred L. Magoon, Jr.
BY Cushman, Darby & Cushman
ATTORNEYS 3,148,414
MANDREL FOR THE CASTING OF PIPE
Herbert D. Boggs, 508 Firethorne St., Brea, Calif., and Fred L. Magoon, Jr., 1400 Dale St., Longview, Tex.
Original application June 28, 1956, Ser. No. 594,565, now Patent No. 2,997,737, dated Aug. 29, 1961. Divided and this application Dec. 29, 1960, Ser. No. 79,321
5 Claims. (Cl. 18—45)

This invention relates to methods and apparatus for the manufacture of plastic pipe, and, more particularly, of centrifugally cast plastic pipe which is reinforced by woven glass filaments.

The arts concerning the manufacture of fibrously reinforced plastic piping and, more specifically, piping formed from thermosetting plastic material, such as thermosetting resins, and reinforced with various fibrous elements, and more specifically with fibrous elements formed of glass filament formations, have been extensively disclosed and discussed in detail in the copending applications of H. D. Boggs, Serial No. 200,193, filed December 11, 1950, now Patent No. 2,776,450, issued January 8, 1957, Serial No. 264,976, filed January 4, 1952, now Patent No. 2,785,442, issued March 19, 1957, and Serial No. 459,092, filed September 29, 1954, now abandoned, and in the following copending applications assigned to a common assignee: Kenneth A. Schafer, Serial No. 280,766, filed April 5, 1952, now abandoned, which application was the parent of the application which matured into Patent No. 2,994,919, and Lewis Perrault, Serial No. 404,329, filed January 15, 1954, now Patent No. 2,940,119.

It is within the contemplation of this invention to prepare uniformly formed, fibrously reinforced, plastic piping of the type illustrated or discussed in some of these applications, as well as provide improvements in the apparatus and methods, for preparing such plastic pipe, described in others of these applications.

It is therefore an object of this invention to provide new and improved means, and new and improved combinations of means, for manufacturing fibrously reinforced plastic pipe.

It is another object of this invention to provide new and improved apparatus for manufacturing fibrously reinforced plastic pipe which provides greater uniformity of product and better quality control.

It is another object of this invention to provide new and improved apparatus for manufacturing fibrously reinforced plastic pipe, which apparatus can be easily and continuously operated by a small labor force.

More particularly it is an object of this invention to provide new and improved means for the insertion of the elongated fibrous reinforcement element into a mold wherein the pipe is to be formed by the introduction of a plastic material into and about the fibrous reinforcement element.

These and other objects of this invention will be fully understood from the following detailed description of a typical preferred form and application of the invention, throughout which description reference is made to the accompanying drawings in which:

FIGURE 1 is an elevational view, with portions broken away, to show details of interior construction of a mandrel assembly;

FIGURE 2 is an end view of the mandrel taken along lines 2—2 of FIGURE 1;

FIGURE 3 is a section taken along lines 3—3 of FIGURE 1.

*General Description*

Before making a detailed disclosure of the apparatus and methods for forming plastic pipe which constitute this invention, a general description will be presented.

The apparatus of this invention includes a mandrel assembly upon which reinforcement elements in the form of concentric sleeves or tubes of glass fiber are woven or braided by conventional braiding apparatus. The mandrel assembly consists of a cylindrical mandrel core enclosed within a cylindrical mandrel sleeve, the latter being separated into several longitudinally extending segments. A plurality of fibrous tubes are braided in concentric layers on the exterior of the assembled mandrel, with each of the fibrous tubes being subjected to a heat cleaning treatment prior to being circumscribed by the next tube. Each mandrel assembly has a length equal to a length of the sections of the pipe to be formed and is arranged to smoothly abut, in tandem relation, against another mandrel assembly to form, in effect, a continuous mandrel, so that the braiding machines form continuous lengths of concentric fibrous tubes which are subsequently cut off in lengths approximating that of each individual mandrel assembly.

In other words, after the concentric fibrous reinforcement elements have been formed upon the tandemly arranged mandrels, the mandrels are separated with the reinforcement elements being cut at the points of separation. Thereafter each mandrel, which is circumscribed by a reinforcement element consisting of two or more concentric woven fibrous sleeves or tubes, is placed on a mold-feeding assembly, which serves a plurality of pipe casting molds. The mold-feeding assembly is aligned with, and selectively positioned relative to, a selected mold and then mechanisms thereon are operated to insert the mandrel assembly, together with the woven reinforcement element, into the mold. Other mechanisms on the mold-feeding assembly are then operated to withdraw the core of the mandrel assembly from the mold, leaving a major portion of the mandrel sleeve, together with the fibrous reinforcement element, therewithin. The remaining elements or segments of the mandrel sleeve are then removed by hand, or by other means, to leave the woven fibrous reinforcement element smoothly disposed against the inner periphery of the cylindrical casting mold.

This invention also includes means for introducing heat settable material, such as thermosetting resins and the like, through the ends of the molds and uniformly along the entire length of the interiors thereof in a manner which will not disturb the placement of the individual fibers of the woven fibrous reinforcement element disposed therewithin.

This invention further includes means for centrifugally casting plastic impregnated fibrously reinforced piping by providing means for concurrently heating and rotating the mold, as well as for concurrently cooling and rotating the mold.

It is also within the contemplation of this invention to provide means for uniformly heating the contents of the mold, prior to the heat setting of the thermosetting material, by blowing heated air through alternating ends of the mold.

It is also within the contemplation of this invention to provide means for uniformly cooling newly formed plastic impregnated, fibrously reinforced pipe while it is undergoing an exothermic reaction within the mold, just after it has been heat set into its final physical form, by blowing air through the alternating ends of the mold.

There is a pipe ejecting assembly, arranged to serve a plurality of the casting molds, which is aligned with a mold in which the plastic pipe has been formed, and which carries mechanisms thereon to withdraw the newly formed plastic pipe from the molds in a manner which eliminates any danger of damage to the pipe.

For the sake of clairity, the various apparatus and means briefly described hereinabove will be separately described and illustrated.

Referring to FIGURE 1, the mandrel assembly, generally indicated at 9, includes a mandrel core 10 which is formed of cylindrical stock and may be hollow to save material and avoid excessive weight. One end of the mandrel core 10 has a cylindrical projection 12 of reduced diameter, and the other end is formed to define a cylindrical socket 14, which is dimensioned to snugly, but slidably, receive a projection 12 from another identical mandrel. The bottom or end wall 16 of the socket 14 has a centrally located threaded aperture 18 therein, although if the mandrel core 10 is formed of solid stock, the aperture will be replaced by a similarly located threaded socket.

The free end of the projection 12 may be beveled, as at 20, and the mouth of socket 14 may be beveled, as at 22, to facilitate the entrance of a projection into the socket. Similarly, the mouth of the aperture 18 may be beveled, as at 26, to aid in the reception of either a projection (12) of another similar mandrel or a member which will be described hereinafter. It should be noted that the axial length of each projection 12 is somewhat greater than the depth, or axial length of each socket 14, the difference in length being substantially equal to the axial length of a collar, generally indicated at 24, formed by the end portions of the slips 27, 28, 29, and 30 (FIGURES 2 and 3), which will now be described.

Each mandrel is provided with a plurality of, and in a preferred embodiment four, slips 27, 28, 29, 30. The slips 27, 28, 29 and 30 are formed of relatively thin lengths of metal, each having an arcuate cross section, and the slips of a given mandrel, when properly arranged together, form a cylindrical sleeve which encloses the exterior periphery of the mandrel core 10 and which extends the entire length thereof. Each of the slips has a shoulder 32 welded, or formed, thereon to extend radially inward, relative to the arcuate curvature of a section thereof. The free end of each of the shoulders 32 is arcuately curved, about the same center as the arcuate curve of its slip, so that the combination of the shoulders of all of the slips 27, 28, 29 and 30 fitted on a given mandrel core 10 form an inwardly extending, circumferential collar, generally indicated at 24, on the sleeve formed thereby. Actually, as best shown in FIGURE 2, this circumferential collar is only approximated and is not complete because the radially-inwardly extending neighboring surfaces 25 of some of the shoulders 32 are not parallel, but rather diverge, by perhaps 30°, as they extend inwardly. The approximated collar 24 has an interior diameter somewhat greater than the exterior diameter of the projection 12, and, as best shown in FIGURE 1, the thickness of the approximated collar 24, that is to say its axial length, is approximately equal to the difference between the length of the projection 12 and the depth, i.e., axial length, of the sock 14. It will therefore be seen that when identical mandrel cores 10, each fitted with an enclosing sleeve formed by the slips 27, 28, 29 and 30, are tandemly aligned, and then moved into axial abutment, the several mandrel assemblies 9 will form an essentially continuous mandrel having a substantially smooth and unbroken cylindrical exterior.

While in the illustrated preferred embodiment there are four slips 27, 28, 29 and 30, it is within the contemplation of this invention that there may be more or less. In any event, one of the slips 27, which is preferably small, i.e., narrow, is permanently affixed, as by screws 36 (FIGURE 1), to the mandrel core 10. The other slips are held in position by a circumferential tension spring 38, one or more of which may circumscribe the entire mandrel assembly 9.

Referring to FIGURE 1, it will be seen that each shoulder 32 has a small pin 39 on the inner surface thereof, that is on the surface abutting the end surfaces of the mandrel core 10, and that the end surface of the core has a complementary socket to snugly receive this pin.

This application is a divisional of co-pending application Serial No. 594,565, filed June 28, 1956, now Patent No. 2,997,737, issued August 29, 1961.

Having described only a typical preferred form and application of our invention, we do not wish to be limited or restricted to specific details herein set forth but wish to reserve to ourselves any variations or modifications that may appear to those skilled in the art and falling within the scope of the following claims.

We claim:

1. Apparatus for supporting a tubular reinforcement element having nominal bending strength while inserting the same into a close fitting tubular mold and for depositing said element therein in peripheral contact therewith including the combination of: a cylindrical mandrel core; a key on said mandrel extending longitudinally thereof; a plurality of elongated slips disposed along the peripheral surface of said core with their longitudinal axes parallel to the longitudinal axis of said core, said slips being arcuate in cross section with their concave surfaces curved complementary with the curvature of the peripheral surface of said core and being in contact therewith, said slips having a thickness substantially equal to the height of said key; the outer surfaces of said key and said slips defining a cylinder; said slips being so formed and arranged that the cylinder defined thereby will collapse solely upon the withdrawal of the mandrel core, together with its said key, therefrom.

2. Apparatus for supporting a tubular reinforcement element having nominal bending strength while inserting the same into a close fitting tubular mold and for depositing said element therein in peripheral contact therewith including the combination of: an elongated mandrel core; a plurality of elongated slips disposed along the periphery of said core in contact therewith with their longitudinal axes parallel with the longitudinal axis of said core; each of said slips having an inner surface facing said core and an arcuate outer surface; at least one of said slips being fixed to said core to effectually define a longitudinally extending key on the exterior thereof; the outer surfaces of the several said slips defining a cylinder; said slips being so formed and arranged that the cylinder defined thereby will collapse solely upon the withdrawal of the mandrel core therefrom.

3. The structure defined in claim 2 in which at least one of said slips is fixed to said mandrel core to effectually define a longitudinally extended key on the exterior thereof and further including an axially extending projection on a first end of said mandrel core; an axially extending socket defined by the second end of said mandrel core; the cross sections of said socket and said projection being coaxial and substantially congruent; and means in said socket for engaging a mandrel withdrawing means.

4. The structure defined in claim 3 in which at least some of said slips have portions extending longitudinally beyond said first end of said mandrel core; said portions being formed to extend radially (of their arcuate surfaces) inwardly and toward said projections.

5. The structure defined in claim 4 in which said radially inward portions have a length, along a line parallel to the axis of said mandrel core, at least equal to the difference in the axial lengths of said projection and said socket.

References Cited in the file of this patent
UNITED STATES PATENTS

| | | |
|---|---|---|
| 376,019 | Wilder | Jan. 3, 1888 |
| 1,029,024 | Murray | June 11, 1912 |
| 2,297,648 | Cushman | Sept. 29, 1942 |
| 2,904,279 | Ewing | Sept. 15, 1959 |

UNITED STATES PATENT OFFICE
CERTIFICATE OF CORRECTION

Patent No. 3,148,414                      September 15, 1964

Herbert D. Boggs et al.

It is hereby certified that error appears in the above numbered patent requiring correction and that the said Letters Patent should read as corrected below.

In the grant, line 2, after "Texas," insert -- assignors, by mesne assignments, to H. D. Boggs Company, Ltd., of Omaha, Nebraska, a limited partnership, --; line 11, for "Herbert D. Boggs and Fred L. Magoon, Jr., their heirs" read -- H. D. Boggs Company, Ltd., its successors --; in the heading to the printed specification, lines 3 and 4, for "Herbert D. Boggs, 308 Firethorne St., Brea, Calif., and Fred L. Magoon, Jr., 1400 Dale St., Longview, Tex." read -- Herbert D. Boggs, Brea, Calif., and Fred L. Magoon, Jr., Longview, Tex., assignors, by mesne assignments, to H. D. Boggs Company, Ltd., Omaha, Nebr., a limited partnership --.

Signed and sealed this 16th day of February 1965.

(SEAL)
Attest:

ERNEST W. SWIDER                                     EDWARD J. BRENNER
Attesting Officer                                     Commissioner of Patents